(12) United States Patent
Tomita et al.

(10) Patent No.: US 9,284,911 B2
(45) Date of Patent: Mar. 15, 2016

(54) ENGINE COMBUSTION CHAMBER STRUCTURE, AND INNER WALL STRUCTURE OF THROUGH CHANNEL

(71) Applicant: NGK INSULATORS, LTD., Aichi-prefecture (JP)

(72) Inventors: Takahiro Tomita, Aichi-prefecture (JP); Mikiya Ichimura, Aichi-prefecture (JP); Shigeharu Hashimoto, Aichi-prefecture (JP)

(73) Assignee: NGK INSULATORS, LTD., Aichi-prefecture (JP)

( * ) Notice: Subject to any disclaimer, the term of this patent is extended or adjusted under 35 U.S.C. 154(b) by 0 days.

(21) Appl. No.: 14/291,160

(22) Filed: May 30, 2014

(65) Prior Publication Data

US 2014/0290617 A1    Oct. 2, 2014

Related U.S. Application Data

(63) Continuation of application No. PCT/JP2012/081208, filed on Nov. 30, 2012.

(30) Foreign Application Priority Data

Dec. 2, 2011 (JP) .................................. 2011-264946
Dec. 8, 2011 (WO) .................. PCT/JP2011/078477

(51) Int. Cl.
| | |
|---|---|
| *F02F 1/42* | (2006.01) |
| *F02F 1/24* | (2006.01) |
| *F02F 3/10* | (2006.01) |
| *F01L 3/04* | (2006.01) |
| *F02B 77/11* | (2006.01) |
| *F02B 23/08* | (2006.01) |
| *C23C 28/00* | (2006.01) |
| *C23C 28/04* | (2006.01) |
| *F02F 1/38* | (2006.01) |
| *F02B 23/06* | (2006.01) |

(Continued)

(52) U.S. Cl.
CPC . *F02F 1/24* (2013.01); *C23C 28/00* (2013.01); *C23C 28/04* (2013.01); *C23C 28/042* (2013.01);

(Continued)

(58) Field of Classification Search
CPC ..... F02F 1/38; F02F 1/4214; F02F 2001/245; F02B 1/04; F02B 3/06
USPC ...................................................... 123/193.5
See application file for complete search history.

(56) References Cited

U.S. PATENT DOCUMENTS

| | | | |
|---|---|---|---|
| 4,245,611 A | | 1/1981 | Mitchell et al. |
| 4,254,621 A | * | 3/1981 | Nagumo .......................... 60/282 |

(Continued)

FOREIGN PATENT DOCUMENTS

| | | |
|---|---|---|
| EP | 2436898 A1 | 4/2012 |
| JP | 60-184950 A | 9/1985 |

(Continued)

OTHER PUBLICATIONS

International Search Report for PCT Patent App. No. PCT/JP2012/081208 (Feb. 12, 2013).

(Continued)

*Primary Examiner* — Lindsay Low
*Assistant Examiner* — Charles Brauch
(74) *Attorney, Agent, or Firm* — Cermak Nakajima & McGowan LLP; Tomoko Nakajima

(57) ABSTRACT

Provided is an engine combustion chamber structure. Also provided is an inner wall structure for a through channel, through which exhaust gas or intake gas of the engine passes. An engine combustion engine structure is provided with a heat-insulating member on the inner wall of an engine constituent member which constitutes an engine combustion chamber, the heat-insulating member containing a heat-insulating porous layer formed from ceramics, and a surface dense layer formed on the surface of the heat-insulating porous layer and formed from ceramics. The surface dense layer of the heat-insulating member has an open porosity of 5% or less, and preferably the heat-insulating porous layer has a larger open porosity than the open porosity of the surface dense layer.

15 Claims, 3 Drawing Sheets

(52) U.S. Cl.
CPC ............... *C23C 28/32* (2013.01); *C23C 28/345* (2013.01); *C23C 28/3455* (2013.01); *F01L 3/04* (2013.01); *F02B 23/08* (2013.01); *F02B 77/11* (2013.01); *F02F 3/10* (2013.01); *F01L 2101/00* (2013.01); *F01L 2101/02* (2013.01); *F01L 2103/00* (2013.01); *F01L 2820/01* (2013.01); *F02B 2023/0612* (2013.01); *F02F 1/38* (2013.01); *F02F 2001/248* (2013.01); *F05C 2251/048* (2013.01); *Y02T 10/125* (2013.01)

(56) References Cited

U.S. PATENT DOCUMENTS

| | | |
|---|---|---|
| 2008/0149897 A1 | 6/2008 | Burkle |
| 2012/0042859 A1 | 2/2012 | Sakai |
| 2012/0082841 A1 | 4/2012 | Kadoshima et al. |
| 2012/0180748 A1 | 7/2012 | Burkle |

FOREIGN PATENT DOCUMENTS

| | | | |
|---|---|---|---|
| JP | 61-169241 A | | 7/1986 |
| JP | 61-268850 A | | 11/1986 |
| JP | 01170745 A | * | 7/1989 |
| JP | 02-175064 A | | 7/1990 |
| JP | 03-281936 A | | 12/1991 |
| JP | 2008-533349 A | | 8/2008 |
| JP | 2010-070792 A | | 4/2010 |
| JP | 2010-249008 A | | 11/2010 |
| JP | 2011-052630 A | | 3/2011 |
| WO | WO2011/027214 A2 | | 3/2011 |

OTHER PUBLICATIONS

Written Opinion for PCT Patent App. No. PCT/JP2012/081208 (Feb. 12, 2013).

Supplementary European Search Report for European Patent App. No. 12854385.7 (Sep. 2, 2015).

* cited by examiner

ENGINE COMBUSTION CHAMBER STRUCTURE, AND INNER WALL STRUCTURE OF THROUGH CHANNEL

TECHNICAL FIELD

The invention relates to the engine combustion chamber structure for improving thermal efficiency of an engine and fuel consumption. More specifically, the invention relates to an engine combustion chamber structure made by focusing on heat transfer caused by radiation from the fuel combustion flame to the inner walls constituting the engine combustion chamber. Furthermore, the invention relates to the inner wall structure of a through channel, which is one of the members constituting a vehicle, and through which intake and exhaust gas of an engine passes.

BACKGROUND ART

Improvement of the thermal efficiency of an engine is desired for the purpose of improving fuel consumption. Patent Document 1 describes an invention for providing a film having low thermal conductivity and low heat capacity, preventing such problems as peeling and dropping off, and which has high durability and reliability for use in an engine combustion chamber. In the invention according to Patent Document 1, an anodic oxide coating with a film thickness ranging from more than 20 μm to 500 μm and a porosity of 20% or more is formed on the inner wall constituting an engine combustion chamber for improving the thermal efficiency of the engine.

Patent Document 2 describes an invention for providing an internal combustion engine having structural members with improved thermal insulation performance. In the internal combustion engine according to Patent Document 2, a heat insulating material is provided adjacent to the inner wall of an exhaust gas through channel, wherein a heated working medium (exhaust gas) flows along the through channel formed using the heat insulating material. The heat insulating material is laminated in a state such that spherical mesoporous silica particles with an average diameter of 0.1 to 3 μm agglomerate via a bonding material. A number of meso pores with an average diameter of 1 to 10 nm are provided on each of the spherical mesoporous silica particles.

PRIOR ART DOCUMENTS

Patent Documents

Patent Document 1: JP-A-2010-249008
Patent Document 2: JP-A-2011-52630

SUMMARY OF THE INVENTION

Problems to be Solved by the Invention

In each of the technologies according to Patent Documents 1 and 2, a porous material is formed on the inner wall of an engine combustion chamber for improving the thermal efficiency of the engine in order to realize low thermal conductivity and low heat capacity. When the inner wall of an engine combustion chamber is porous, however, radiation heat transferred from the combustion flame cannot be suppressed (in other words, radiation heat passes through the inner wall), potentially allowing heat to be easily conducted to structural members of the engine. Particularly in the case of a direct injection type engine, fuel directly injected into an engine combustion chamber may be absorbed by the porous inner wall, potentially preventing the occurrence of a normal combustion reaction. In the technology according to Patent Document 1, fuel may seal pores.

Furthermore, when the inner wall of the combustion chamber is porous, a very small quantity of soot generated after combustion or cinders of impurities in the fuel may easily be deposited on the inner wall, potentially causing the characteristics of the heat-insulating porous layer to change and the thermal conductivity and heat capacity to become higher. Patent Document 1 includes descriptions regarding the sealing of open ends of pores by a dense layer on the top surface of an anodic oxide coating. However, it is generally recognized that the dense layer is preferably as thin as possible in terms of having low thermal conductivity and low volume heat capacity; moreover, the document also includes a description that no specific differences can be recognized in the heat characteristics even when the openings are sealed.

In each of the technologies according to Patent Documents 1 and 2, a coating film with high heat insulating properties is formed on the inner wall of an engine combustion chamber to prevent heat conducted to the top surface on the inner wall of the engine combustion chamber from being transferred inside the structural members of the engine. However, no attention is paid to heat transfer by radiation from the combustion flame to the top surface of the inner wall in relation to suppression of the conduction of heat generated by the combustion of gas to the top surface of the inner wall of the engine combustion chamber.

An object of the invention is to provide an engine combustion chamber structure and inner wall structure of a through channel in which gas taken in by or exhausted from the engine flows for the purpose of improving thermal efficiency of an engine and improving fuel consumption.

Means to Solve the Problems

The inventors found that the abovementioned object could be achieved by providing an engine combustion chamber structure with heat-insulating members each comprising a dense surface layer and a heat-insulating porous layer. That is, the invention provides an engine combustion chamber structure and inner wall structure of a through channel in which gas taken in by or exhausted from the engine flows as respectively described below.

[1] An engine combustion chamber structure having a heat-insulating member comprising a heat-insulating porous layer formed with ceramics on the inner walls of engine components constituting an engine combustion chamber, and a dense surface layer formed with ceramics on the surface of said heat-insulating porous layer.

[2] The engine combustion chamber structure according to said [1] in which an open porosity of said dense surface layer is 5% or less and the porosity of said heat-insulating porous layer is larger than said open porosity of said dense surface layer.

[3] The engine combustion chamber structure according to said [1] or [2] in which the thickness of said dense surface layer is within the range from 1 to 50% of the thickness of said heat-insulating porous layer.

[4] The engine combustion chamber structure according to any of said [1] to [3] in which the reflection factor of said dense surface layer at a wavelength of 1.5 μm is larger than 0.5.

[5] The engine combustion chamber structure according to any of said [1] to [4] in which the radiation factor of said dense surface layer at a wavelength of 2.5 μm is larger than 0.5.

[6] The engine combustion chamber structure according to any of said [1] to [5] in which the thickness of said dense surface layer is 20 μm or less.

[7] The engine combustion chamber structure according to any of said [1] to [6] in which the thermal conductivity of said heat-insulating porous layer is 0.5 W/(m·K) or less.

[8] The engine combustion chamber structure according to any of said [1] to [7] in which the heat capacity of said heat-insulating porous layer is 1,000 kJ/(m$^3$·K) or less.

[9] The engine combustion chamber structure according to any of said [1] to [8] in which the thickness of said heat-insulating porous layer is within the range from 20 to 500 μm.

[10] The engine combustion chamber structure according to any of said [1] to [9] in which a first bonding layer is provided between said heat-insulating porous layer and said dense surface layer.

[11] The engine combustion chamber structure according to any of said [1] to [10] in which a second bonding layer is provided between said inner wall of said engine component and said heat-insulating porous layer.

[12] The engine combustion chamber structure according to any of said [1] to [11] in which said heat-insulating member is provided on the surface constituting an engine combustion chamber of at least any one among a piston, a valve head, and a cylinder head.

[13] An inner wall structure of a through channel including a heat-insulating member comprising a heat-insulating porous layer formed with ceramics on the inner wall of a through channel as one vehicle component in which gas taken in by or exhausted from the engine flows, along with a dense surface layer formed with ceramics of the surface of said heat-insulating porous layer.

[14] The inner wall structure of a through channel according to said [13] in which the open porosity of said dense surface layer is 5% or less and the porosity of said heat-insulating porous layer is larger than said open porosity of said dense surface layer.

[15] The inner wall structure of a through channel according to said [13] or [14] in which the thickness of said dense surface layer is within the range from 1 to 50% of the thickness of said heat-insulating porous layer.

[16] The inner wall structure of a through channel according to any of said [13] to [15] in which a first bonding layer is provided between said heat-insulating porous layer and said dense surface layer.

[17] The inner wall structure of a through channel according to any of said [13] to [16] wherein a second bonding layer is provided between said inner wall of the through channel, through which intake and exhaust gas from an engine passes, and said heat-insulating porous layer.

Effects of the Invention

By using a heat-insulating member comprising two layers, a dense surface layer and a heat-insulating porous layer, it is possible to improve the thermal insulation performance of an engine combustion chamber and improve fuel consumption. When the dense surface layer is a dense layer with an open porosity of 5% or less, it is possible to reflect radiation in addition to suppressing the absorption of fuel and deposition of cinders. By providing a heat-insulating porous layer under the dense surface layer, it is possible to suppress heat transfer to the engine components. Moreover, by providing a heat-insulating member comprising two layers, a dense surface layer and a heat-insulating porous layer, in a through channel through which intake and exhaust gas of an engine passes, it becomes possible to improve the heat insulating effect.

MODE FOR CARRYING OUT THE INVENTION

An embodiment of the invention is described below with reference to the figures. The invention is not limited to the embodiment described below and may be altered, modified, or improved without departing from the scope of the invention.

Figure 1:
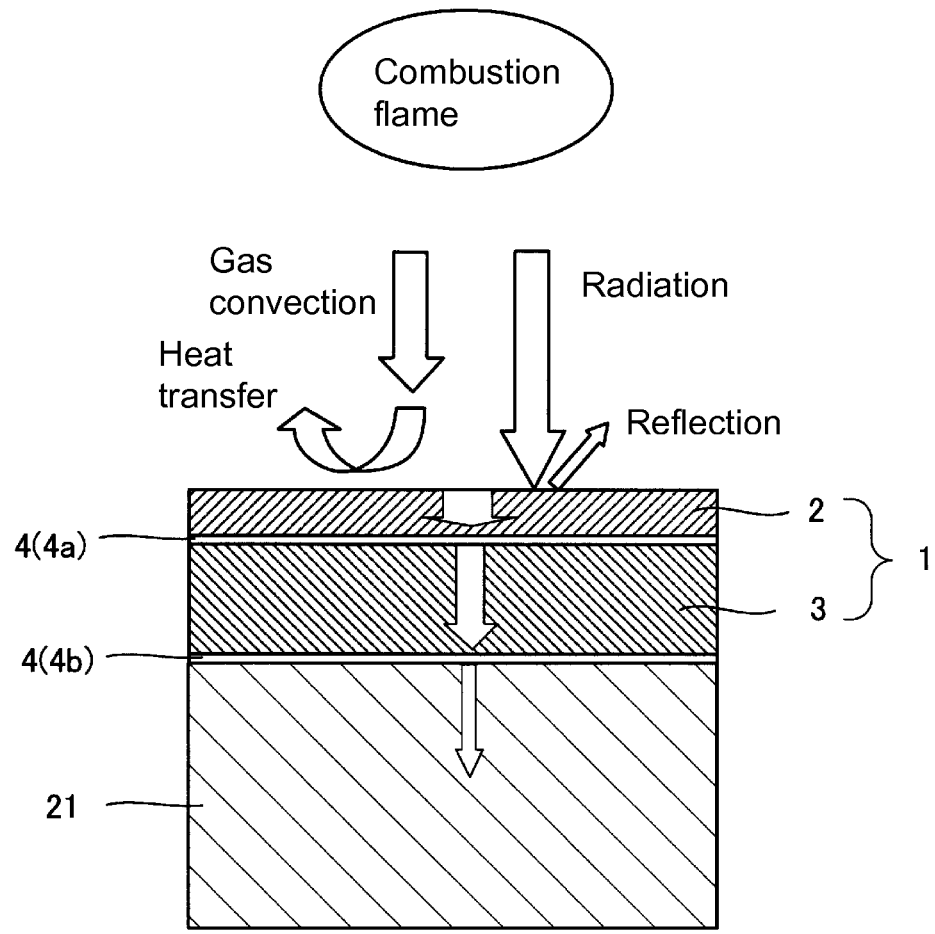
FIG. 1 is a schematic diagram illustrating a heat-insulating member comprising a dense surface layer and a heat-insulating porous layer.

An engine combustion chamber structure having a heat-insulating member 1 according to the invention is described below with reference to FIG. 1 and FIG. 2. The engine combustion chamber structure according to the invention is provided with the heat-insulating member 1 comprising a heat-insulating porous layer 3 formed with ceramics on the inner walls of engine components 21 (such as cylinder block 11, cylinder head 13, piston 14 etc.) forming an engine combustion chamber 20 and dense surface layer 2 formed with ceramics on the surface of heat-insulating porous layer 3. The dense surface layer 2 of the heat-insulating member 1 preferably has an open porosity of 5% or less while heat-insulating porous layer 3 has a porosity (open porosity+closed porosity) which is preferably larger than the open porosity of the dense surface layer 2. As shown in FIG. 1, a bonding layer 4 is provided between the dense surface layer 2 and heat-insulating porous layer 3 and between engine component 21 and heat-insulating porous layer 3 such that they can be bonded with each other. Moreover, a structure not containing the bonding layer 4 is also possible.

Since the heat-insulating member 1 has two layers, namely the dense surface layer 2 and heat-insulating porous layer 3 provided under the dense surface layer 2, it becomes possible to improve the thermal insulation performance of engine combustion chamber 20. The dense surface layer 2 preferably has a thickness within the range from 1 to 50% of the thickness of the heat-insulating porous layer 3. During fuel combustion in engine combustion chamber 20, radiation can be reflected by the dense surface layer 2, while during exhaust, heat can be radiated from the dense surface layer 2. Furthermore, the heat-insulating porous layer 3 can suppress heat transfer from the dense surface layer 2 to an engine component 21. Due to this, during fuel combustion, the temperature of the inner wall of the engine component 21 (wall surface constituting the engine combustion chamber 20) can easily rise following the gas temperature in the engine combustion chamber 20.

Figure 3:
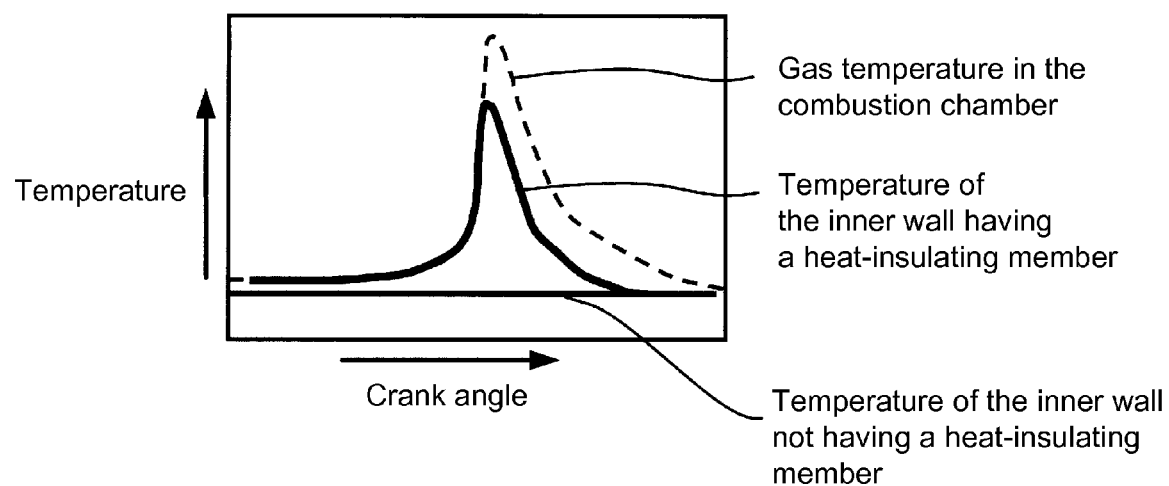
FIG. 3 is a view illustrating gas temperatures and inner wall temperatures in an engine combustion chamber.

FIG. 3 is a view illustrating the gas temperatures in the engine combustion chamber 20 and the temperatures of the inner wall of the engine component 21. The horizontal axis expresses a crank angle of an engine 10 which corresponds to time. The vertical axis expresses a temperature. It is understood that the temperature of the inner wall not having heat-insulating member 1 is largely different from the gas temperature in the engine combustion chamber 20. It is also understood that the temperature of the inner wall having the heat-insulating member 1 easily rises following the gas temperature in the engine combustion chamber 20. As described above, when the temperature of the inner wall easily rises following the gas temperature in the engine combustion chamber 20, it becomes possible to reduce heat loss in addition to preventing intake gas from being excessively heated.

(Dense Surface Layer)

Now, the dense surface layer 2 of the heat-insulating member 1 is described. The dense surface layer 2 is a dense ceramic layer formed on the surface of the heat-insulating porous layer 3 having a porous structure. The dense surface layer 2 preferably has an open porosity of 5% or less, more preferably in the range from 0.01 to 4%, and further preferably in the range from 0.01 to 3%. When this condition is satisfied, it becomes possible to prevent heat transfer due to the convection of gas (fuel) during fuel combustion. Due to the density, the absorption of fuel and deposition of soot and cinders rarely occur.

The dense surface layer 2 is made of a material capable of suppressing heat transfer caused during fuel combustion by radiation from the combustion flame which is a heat source. Furthermore, the dense surface layer 2 is preferably made of a material which can easily radiate heat from itself during gas exhaustion. To satisfy this need, it is desirable to control the reflection factor and radiation factor in the wavelength region estimated based on Wien's displacement law ($\lambda_m T = 2,898$ [μm·K] wherein $\lambda_m$ indicates the wavelength at which the radiation strength is maximized, while T indicates temperature). In other words, a reflection factor is preferably large at a wavelength smaller than 2 μm, while a radiation factor is preferably large at a wavelength larger than 2 μm. When these conditions are satisfied, heat transfer due to radiation to the inner walls constituting engine combustion chamber 20 can be suppressed just after start of combustion and in the first half of combustion. While in the second half of combustion and during gas exhaustion, heat is radiated from the dense surface layer 2 to exhaust gas when the temperature is low, preventing subsequently introduced intake gas from being heated.

The reflection factor of the dense surface layer 2 at a wavelength of 1.5 μm is preferably larger than 0.5. It is more preferable that the reflection factor at a wavelength in the range of 1 to 2 μm is larger than 0.5, and even more preferably larger than 0.6. Due to having a reflection factor of the dense surface layer 2 satisfying the conditions as described above, it is possible to suppress heat transfer to the heat-insulating porous layer 3. The radiation factor of the dense surface layer 2 at a wavelength of 2.5 μm is preferably larger than 0.5, more preferably larger than 0.6, and even more preferably larger than 0.7. Due to having a radiation factor of dense surface layer 2 satisfying the conditions described above, it is possible that the heated dense surface layer 2 can easily be cooled.

A heat capacity of the dense surface layer 2 is preferably 3,000 kJ/(m³·K) or less, more preferably in the range from 1.2 to 2,000 kJ/(m³·K), and even more preferably in the range from 1.2 to 1,000 kJ/(m³·K). Due to said low heat capacity (a small film thickness, a small volume), the temperature of the inner walls of the engine component 21 can easily follow the temperature of gas in the engine combustion chamber 20. Therefore, the difference between the gas temperature and heat-insulating member 1 (dense surface layer 2) becomes smaller, resulting in a reduction in the cooling loss.

The thermal conductivity of the dense surface layer 2 is preferably 3 W/(m·K) or less, more preferably in the range from 0.02 to 2 W/(m·K), and even more preferably in the range from 0.02 to 1 W/(m·K). When the thermal conductivity satisfies the conditions described above, heat transfer to heat-insulating porous layer 3 can be suppressed.

The thickness of the dense surface layer 2 is preferably 20 μm or less. When the thickness is in the range described above, heat transfer to the heat-insulating porous layer 3 can be suppressed.

The dense surface layer 2 can be formed with ceramics, such as alumina, silica, mulite, silicon nitride, silicon carbide, titania, zirconia, zinc oxide, glass, and the same.

(Heat-Insulating Porous Layer)

Next, the heat-insulating porous layer 3 is described. The heat-insulating porous layer 3 is made of ceramics, the porosity (open porosity+closed porosity) of heat-insulating porous layer 3 is preferably larger than the open porosity of the dense surface layer 2. The porosity of the heat-insulating porous layer 3 is preferably within the range from 10 to 99%, and more preferably within the range from 20 to 90%. When the conditions described above are satisfied, it is possible to suppress heat transfer from the dense surface layer 2 to engine component 21.

The thermal conductivity of the heat-insulating porous layer 3 is preferably 0.5 W/(m·K) or less, more preferably in the range from 0.02 to 0.3 W/(m·K), and even more preferably in the range from 0.02 to 0.1 W/(m·K). Due to said low thermal conductivity, heat transferred from the dense surface layer 2 to the engine component 21 can be suppressed.

The heat capacity of the heat-insulating porous layer 3 is preferably 1,000 kJ/(m³·K), more preferably in the range from 1.2 to 800 kJ/(m³·K), and even more preferably in the range from 1.2 to 500 kJ/(m³·K). Due to said low heat capacity, the gas temperature in the engine combustion chamber 20 can easily be lowered once gas generated after fuel combustion is exhausted. As a result, the compression ratio of fuel can be improved.

Young's module of the heat-insulating porous layer 3 is preferably 50 GPa or less. When the Young's module is low, it is possible to lower the thermal stress or thermal shock generated due to mismatching between the thermal expansion of the engine component 21 and that of the dense surface layer 2.

The thickness of the heat-insulating porous layer 3 is preferably within the range from 20 to 500 μm. When the thickness of heat-insulating porous layer 3 is within this range, sufficient insulation effectiveness can be achieved.

The heat-insulating porous layer 3 is made of ceramics, such as silica, alumina, zirconia, titania, silicon nitride, silicon carbide, glass and the same. The materials are preferably amorphous with regards to thermal conductivity. Furthermore, the heat-insulating porous layer 3 may be made of any one of the materials listed above or of a combination of at least two or more materials. For example, the combination may include a composite material in which silica-alumina fibers and hollow silica-alumina particles are dispersed.

(Bonding Layer)

The dense surface layer 2 and the heat-insulating porous layer 3 may be directly bonded with each other; however, the configuration as shown in FIG. 1 is acceptable in which the bonding layer 4 (a first bonding layer 4a) is provided between the dense surface layer 2 and the heat-insulating porous layer 3. Moreover, a configuration is acceptable in which a bonding layer 4 (a second bonding layer 4b) is provided between the inner wall of the engine component 21 constituting the engine combustion chamber 20 and the heat-insulating porous layer 3.

Thermal resistance of the bonding layer 4 is preferably high. More specifically, the thermal resistance is preferably within the range from $10^{-6}$ to 10 m²K/W, more preferably within the range from $10^{-5}$ to 10 m²K/W, and even more preferably within the range from $10^{-4}$ to 10 m²K/W. By forming the bonding layer 4 satisfying any of the conditions described above, the insulation effectiveness becomes more sufficient. In addition, by providing the bonding layer 4 satisfying any of the conditions described above, it is possible to improve thermal shock resistance and thermal stress resistance by mediating any mismatches between the thermal expansions of members to be bonded with each other. For achieving the purpose described above, the thermal expansion coefficient of the bonding layer 4 is preferably an intermediate value between thermal expansion coefficients of the layers bonding with each other (the dense surface layer 2 and the heat-insulating porous layer 3 for the first bonding layer 4a, the heat-insulating porous layer 3 and engine component 21 for the second bonding layer 4b). Furthermore, the Young's module of the bonding layer 4 is preferably lower than that of the layers to which the bonding layer 4 respectively bonds (dense surface layer 2 and heat-insulating porous layer 3 for the first bonding layer 4a, the heat-insulating porous layer 3 and the engine component 21 for the second bonding layer 4b). Furthermore, the bonding layer 4 is preferably made of a material which can suppress reactions between layers bonding with each other (the dense surface layer 2 and the heat-insulating porous layer 3 for the first bonding layer 4a, the heat-insulating porous layer 3 and the engine component 21 for the second bonding layer 4b). When this requirement is satisfied, resistance to oxidation and reactions can be improved, and durability of the heat-insulating material is improved.

A material which has a conjugating function or can be formed into thin film is preferable as a material for bonding layer 4. Such material includes, for instance, an inorganic adhesive material, a colloidal liquid, a pre-ceramic polymer, a brazing material, or a plated film.

(Arrangement of the Heat-Insulating Material)

Next, the arrangement of the heat-insulating member 1 is described. The heat-insulating member 1 is provided on the surface (inner wall) of the engine component 21 constituting the engine combustion chamber 20. More specifically, heat-insulating member 1 is provided, for example, on a top surface 14s of a piston 14, on a valve head 16s of an air intake valve 16, on a valve head 17s of an exhaust valve 17, or on a bottom surface 13s of a cylinder head 13.

Figure 2:
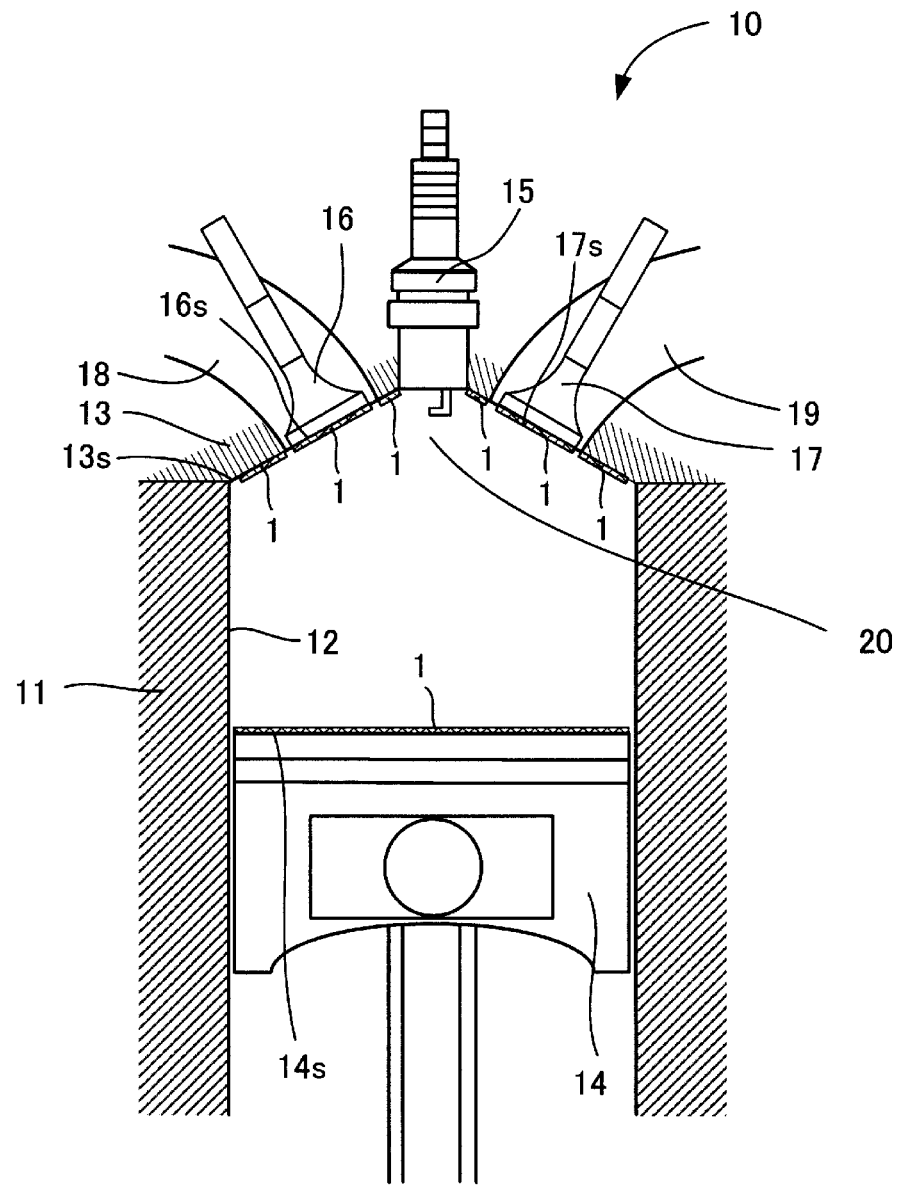
FIG. 2 is a schematic diagram illustrating an embodiment of an engine.

FIG. 2 illustrates an embodiment of an engine. The Engine 10 comprises a cylinder block 11 in which cylinder 12 is formed, and the cylinder head 13 covering the top surface of the cylinder block 11. In the cylinder 12 of the cylinder block 11, the piston 14 is provided slidably in the vertical direction.

An ignition plug 15 is attached to the cylinder head 13. Moreover, air intake valve 16 and exhaust valve 17 are attached thereto, wherein the air intake valve 16 can open or close an intake channel 18 formed on the cylinder head 13, while the exhaust valve 17 can open or close an exhaust channel 19.

As shown in FIG. 2, the heat-insulating member 1 is provided on the top surface 14s of the piston 14. The heat-insulating member 1 is also provided on the valve head 16s of the air intake valve 16, on the valve head 17s of the exhaust valve 17, and on the bottom surface 13s of the cylinder head 13. These surfaces constitute the engine combustion chamber 20, wherein by providing the heat-insulating member 1 on these surfaces, it is possible to improve the heat insulation performance.

When the air intake valve 16 is opened, fuel is supplied inside the engine combustion chamber 20 surrounded by the cylinder 12, cylinder head 13, and piston 14, after which the fuel is ignited by ignition plug 15, and the combustion of the fuel is started. Once the combustion of fuel is started, the piston 14 is pressed downward. Exhaust gas generated by the combustion of the fuel is exhausted via the opening of exhaust valve 17.

It should be noted that the heat-insulating member 1 may be provided on a surface other than the surface (inner wall) of the engine component 21 constituting the engine combustion chamber 20. For example, the heat-insulating member 1 may be provided on the inner wall of a through channel, which is one of the members constituting a vehicle, and through which intake and exhaust gas of the engine 10 passes. Moreover, an inner wall structure is acceptable in which the first bonding layer 4a is provided between the heat-insulating porous layer 3 and the dense surface layer 2. Furthermore, an inner wall structure is acceptable in which the second bonding layer 4b is provided between the inner wall of a through channel, thorough which intake and exhaust gas of the engine 10 passes, and the heat-insulating porous layer 3.

When the heat-insulating member 1 is provided on the inner wall of the through channel through which intake and exhaust gas of the engine 10 passes, the open porosity of the dense surface layer 2 of the heat-insulating member 1 is preferably 5% or less, while the porosity (open porosity+closed porosity) of the heat-insulating porous layer 3 is preferably larger than the open porosity of the dense surface layer 2. Moreover, the thickness of the dense surface layer 2 is preferably within the range from 1 to 50% of the thickness of the heat-insulating porous layer 3. The reflection factor of the dense surface layer 2 at a wavelength of 1.5 µm is preferably larger than 0.5, with the radiation factor thereof at a wavelength of 2.5 µm preferably larger than 0.5. The thickness of the dense surface layer 2 is preferably 20 µm or less. Furthermore, thermal conductivity of the heat-insulating porous layer 3 is preferably 0.5 W/(m·K) or less, with the heat capacity thereof preferably 1,000 kJ/(m³·K) or less. The thickness of the heat-insulating porous layer 3 is preferably within the range from 20 to 500 µm.

A through channel of, for example, the vehicle engine 10 through which intake and exhaust gas passes, and to which the heat-insulating member 1 is applicable, includes an air intake tube, an intake manifold, an exhaust manifold, a catalytic converter, and a muffler.

When the heat-insulating member 1 is provided in a through channel on the intake side (such as an intake tube, an intake manifold), heat from outside the through channel is not transferred to the air (intake gas) within the through channel, preventing the temperature of air flowing into the engine 10 from rising. As a result, knocking rarely occurs, leading to an improvement of fuel consumption. When heat-insulating member 1 is provided in a through channel on the exhaust side (such as an exhaust manifold, an exhaust pipe, and a catalytic converter), the temperature of the exhaust can be prevented from dropping and the catalyst can be warmed up quickly, improving the function for purifying exhaust gas. Furthermore, when a turbo charger is installed, the exhaust energy increases, leading to an improvement of fuel consumption.

(Manufacturing Method)

Next, the manufacturing method of the heat-insulating member 1 is described. The dense surface layer 2 can be formed, once the heat-insulating porous layer 3 is formed, by applying such as the sputtering method, the PVD method, the EB-PVD method, the CVD method, the AD method, thermal spraying, the plasma spray method, the cold spray method, plating, and heat treatment after wet coating. Alternatively, a dense and thin plate may be manufactured as the dense surface layer 2, wherein the plate may be adhered together with the heat-insulating porous layer 3 to a base material.

The same method applied to manufacturing the dense surface layer 2 may also be applied to manufacturing the heat-insulating porous layer 3; however, for manufacturing porous film, a method such as the EB-PVD method, thermal spraying method, CVD method, and heat treatment after wet coating may be specifically employed. Moreover, a method may be employed for forming a porous film in which particles are deposited by such a method as the electrophoretic deposition or advection accumulation method, after which heat treatment is subsequently applied. Alternatively, a porous thin plate may be separately manufactured, and the plate may be adhered to a base material using a bonding material. Furthermore, a paste may be made by adding filler particles (which are preferably hollow) or a pore forming material and kneading the mixture, then curing or thermally treating the mixture to prepare the heat-insulating porous layer 3.

As for the dense surface layer 2 and heat-insulating porous layer 3, the heat-insulating porous layer 3 may first be formed on the engine component 21 and then forming the dense surface layer 2 thereon; alternatively, the dense surface layer 2 may be formed simultaneously.

The first bonding layer 4a may be formed between the heat-insulating porous layer 3 and the dense surface layer 2 as well as the second bonding layer 4b between an inner wall constituting the engine combustion chamber 20 and the heat-insulating porous layer 3. When the bonding layer 4 (the first bonding layer 4a or the second bonding layer 4b) is provided as described above, the bonding layer 4b (in the case of such as, for example, an inorganic adhesive, colloidal liquid, pre-ceramic polymer, or brazing filler material is used) is applied or plated onto the engine component 21 for forming a film, after which the heat-insulating porous layer 3 is subsequently formed thereon by the method as described above. Subsequently, the first bonding layer 4a is formed in the same manner as the second bonding layer 4b, while the dense surface layer 2 is formed by the method as described above.

EXAMPLES

The invention is described in greater detail below; however, it should be noted that the invention is not limited to these examples.

Example 1

A zirconia dense body with a diameter of 90 mm and a thickness of 20 μm is prepared as the dense surface layer 2. The zirconia dense body is prepared as described below. First, polyvinyl butyral resin (PVB) as a binder, DOP as a plasticizer, and xylene and 1-butanol as solvents are added to partially stabilized zirconia powder containing 3 mol % yttria. Subsequently, the mixture is agitated for 30 hours with a ball mill to prepare slurry for forming a green sheet. By subjecting said slurry to vacuum deaeration processing, the viscosity of the slurry is adjusted to 4,000 cps, after which the green sheet for a thin plate is formed with a doctor blade device such that the thickness after firing is 20 μm. Next, the form of the green sheet is adjusted by cutting such that the diameter is 90 mm. This formed body is fired for 3 hours at 1,500° C. Furthermore, the fired body is held between porous flat alumina plates, each having a thickness of 2 mm, and then fired again for 5 hours at 1,500° C. in order to eliminate warping to prepare a dense zirconia film for the dense surface layer 2.

Subsequently, colloidal silica, fly ash balloon (alumina silica-based hollow and spherical particles), and ceramic fiber are blended to prepare a paste as a precursor body of the heat-insulating porous layer 3. Next, an aluminum alloy plate (with a diameter of 90 mm and a thickness of 1 mm) is prepared as a base material (corresponding to the engine component 21), and the paste as a precursor body of the heat-insulating porous layer 3 is applied to the base material. The zirconia dense body of the dense surface layer 2 is then placed on the applied paste and pressed for adhesion. Then, the assembly is heated at 150° C. for curing.

The dense surface layer 2 thus prepared has an open porosity of 1% and a thickness of 20 μm. Moreover, the heat-insulating porous layer 3 has a porosity of 54%, which is higher than the open porosity of the dense surface layer 2, along with a thickness of 450 μm.

Example 2

A zinc oxide dense body with a diameter of 90 mm and a thickness of 20 μm is prepared as the dense surface layer 2. This zinc oxide dense body is prepared as described below. First, polyvinyl butyral resin (PVB) as a binder, DOP as a plasticizer, and xylene and 1-butanol as solvents are added to zinc oxide powder, and they are blended for 30 hours with a ball mill to prepare slurry for forming a green sheet. This slurry is subjected to vacuum deaeration to adjust the viscosity to 4,000 cps. This slurry is formed into a green sheet for a thin plate with a doctor blade device such that the thickness after firing is 20 μm. Next, the form of this green sheet is modified by cutting such that the diameter is 90 mm. This formed body is fired for 3 hours at 1400° C. Furthermore, this fired body is held between porous and flat alumina plates, each having a thickness of 2 mm. The assembly is then fired again for 5 hours at 1400° C. in order to eliminate warping to prepare the zinc oxide dense body for the preparation of the dense surface layer 2.

Subsequently, as in Example 1, colloidal silica, fly ash balloon (alumina silica-based hollow and spherical particles), and ceramic fibers are blended to prepare a paste as a precursor body of the heat-insulating porous layer 3. Next, an aluminum alloy plate (with a diameter of 90 mm and a thickness of 1 mm) is prepared as a base material (corresponding to the engine component 21). Then, the paste as a precursor body of the heat-insulating porous layer 3 is applied to the base body and the zinc oxide dense body as the dense surface layer 2 is placed on the applied paste. Then, the assembly is pressed for adhesion and subjected to heat treatment at 150° C. for curing.

The dense surface layer 2 has an open porosity of 1% and a thickness of 20 μm. The heat-insulating porous layer 3 has a porosity of 63%, which is higher than the open porosity of the dense surface layer 2, along with a thickness of 400 μm.

Example 3

An aluminum alloy plate (with a diameter of 90 mm and a thickness of 1 mm) is prepared as a base material (corresponding to the engine component 21), and is processed by plating to produce a nickel film as the second bonding layer 4b. Then, alumina sol, ash balloon (hollow and spherical alumina-based particles), and ceramic fibers are blended to prepare a paste as a precursor body of the heat-insulating porous layer 3. The precursor body is applied to the base material with the second bonding layer 4b provided thereon and the assembly is subjected to heat treatment at 400° C. A zinc oxide dense film (dense surface layer 2) is then formed by means of the CVD method.

The dense surface layer 2 has an open porosity of 1% and a thickness of 6 μm. The heat-insulating porous layer 3 has a porosity of 61%, which is higher than the open porosity of the dense surface layer 2, along with a thickness of 450 μm.

Comparative Example 1

Without a Dense Surface Layer

Colloidal silica, fly ash balloon (hollow and spherical alumina silica-based particles), and ceramic fibers are blended to prepare a paste as a precursor body of the heat-insulating porous layer 3. An aluminum alloy plate (with a diameter of 90 mm and a thickness of 1 mm) is prepared as a base material (corresponding to the engine component 21). Then, the paste as a precursor body of the heat-insulating porous layer 3 is applied to the base material, and the assembly is subjected to heat treatment at 150° C. for curing without the dense surface layer 2 being placed thereon.

The heat-insulating porous layer 3 has a porosity of 55% and a thickness of 470 μm.

(Evaluation Method)

The heat insulation performance of an aluminum alloy plate having the heat-insulating member 1 with a multilayered structure (dense surface layer 2+heat-insulating porous layer 3) on the surface thereof is evaluated as described below. The flame of a gas burner is brought closer to the heat-insulating member 1 of the aluminum alloy plate to measure a heat flow rate transferred to the opposite side of the aluminum alloy plate. In the same manner, the heat flow rate of the aluminum alloy plate (not having a heat-insulating member) is measured for comparison and the measurement results are compared.

Specifically, a calorimeter is placed on the side of the aluminum alloy plate having a multilayered heat-insulating member 1 (similar to those in Examples 1 to 3) wherein said side is not provided with the heat-insulating member 1. In the same manner, a calorimeter is placed on the surface of an aluminum alloy plate with a heat-insulating member 1 not containing the dense surface layer 2 for comparison (refer to Comparative Example 1). The two calorimeters are placed equally distant from the flame of a gas burner such that the heat-insulating member 1 faces the flame of the gas burner to measure the heat flow rate in each case. The heat flow rates in Examples 1 to 3 along with that in Comparative Example 1 were compared to each other and it was found that the heat flow rate in Example 1 is 95% of that in Comparative Example 1, while the heat flow rates in Examples 2 and 3 are 90% of that in Comparative Example 1. This result indicates that heat insulation performance is improved by providing the dense surface layer 2.

INDUSTRIAL APPLICABILITY

The engine combustion chamber structure according to the invention can be applied to engines for vehicles, and the same. Moreover, the heat-insulating member having the structure described above can be applied to the inner walls of the through channel through which intake and exhaust gas of an engine passes.

EXPLANATION OF THE SYMBOLS

1: heat-insulating member, 2: dense surface layer, 3: heat-insulating porous layer, 4: bonding layer, 4a: first bonding layer, 4b: second bonding layer, 10: engine, 11: cylinder block, 12: cylinder, 13: cylinder head, 13s: bottom surface, 14: piston, 14s: piston (top surface), 15: ignition plug, 16: intake valve, 16s: valve head, 17: exhaust valve, 17s: valve head, 18: intake channel, 19: exhaust channel, 20: engine combustion chamber, 21: engine component.

The invention claimed is:

1. An engine combustion chamber structure, having a heat-insulating member comprising:
    a heat-insulating porous ceramic layer on the inner walls of engine components, each constituting an engine combustion chamber; and
    a dense surface ceramic layer on a surface of said heat-insulating porous layer;
    wherein a second bonding layer is provided between said inner walls of said engine component and said heat-insulating porous layer; and
    wherein the thermal expansion coefficient of the second bonding layer is an intermediate value between that of the heat-insulating porous layer and that of the inner walls of engine components, and the Young's modulus of the second bonding layer is lower than that of the heat-insulating porous layer and that of the engine components.

2. The engine combustion chamber structure according to claim 1, wherein an open porosity of said dense surface layer is 5% or less and a porosity of said heat-insulating porous layer is larger than said open porosity of said dense surface layer.

3. The engine combustion chamber structure according to claim 1, wherein a thickness of said dense surface layer is within the range from 1 to 50% of a thickness of said heat-insulating porous layer.

4. The engine combustion chamber structure according to claim 1, wherein a reflection factor of said dense surface layer at a wavelength of 1.5 μm is larger than 0.5.

5. The engine combustion chamber structure according to claim 1, wherein a radiation factor of said dense surface layer at a wavelength of 2.5 μm is larger than 0.5.

6. The engine combustion chamber structure according to claim 1, wherein the thickness of said dense surface layer is 20 μm or less.

7. The engine combustion chamber structure according to claim 1, wherein a thermal conductivity of said heat-insulating porous layer is 0.5 W/(m·K) or less.

8. The engine combustion chamber structure according to claim 1, wherein a heat capacity of said heat-insulating porous layer is 1,000 kJ/(m$^3$·K) or less.

9. The engine combustion chamber structure according to claim 1, wherein the thickness of said heat-insulating porous layer is within the range from 20 to 500 μm.

10. The engine combustion chamber structure according to claim 1, wherein a first bonding layer is provided between said heat-insulating porous layer and said dense surface layer.

11. The engine combustion chamber structure according to claim 1, wherein said heat-insulating member is provided on the surface constituting the engine combustion chamber of at least any one among a piston, a valve head, and a cylinder head.

12. An inner wall structure of a through channel comprising a heat-insulating member, wherein the heat-insulating member includes:
    a heat-insulating porous ceramic layer on the inner walls of a through channel which is one of the members constituting a vehicle, and through which intake and exhaust gas of an engine passes; and
    a dense surface ceramic layer on the surface of said heat-insulating porous layer; and wherein a second bonding layer is provide between said inner walls of a through channel through which the intake and exhaust gas of the engine passes, and said heat-insulating porous layer; and wherein the thermal expansion coefficient of the second bonding layer is an intermediate value between that of the heat-insulating porous layer and that of the inner walls of engine components, and the Young's modulus of the second bonding layer is lower than that of the heat-insulating porous layer and that of the engine components.

13. The inner wall structure of a through channel according to claim 12, wherein an open porosity of said dense surface layer is no more than 5% and a porosity of said heat-insulating porous layer is larger than said open porosity of said dense surface layer.

14. The inner wall structure of a through channel according to claim 12, wherein a thickness of said dense surface layer is within the range from 1 to 50% of the thickness of said heat-insulating porous layer.

15. The inner wall structure of a through channel according to claim 12, wherein a first bonding layer is provided between said heat-insulating porous layers and said dense surface layer.

* * * * *